3,657,237
PROCESS FOR MAKING 1,2,5-THIADIAZOLES IN THE SINISTER CONFIGURATION
Leonard M. Weinstock, Rocky Hill, Roger J. Tull, Metuchen, and Dennis M. Mulvey, Iselin, N.J., assignors to Charles E. Frosst & Co.
No Drawing. Filed Apr. 21, 1969, Ser. No. 818,474
Int. Cl. C07d 87/46
U.S. Cl. 260—247.1                                         4 Claims

ABSTRACT OF THE DISCLOSURE

Preparation of S-3-X-4-(3-substituted amino-2-hydroxypropoxy)-1,2,5-thiadiazole beta adrenergic blocking agents using as starting material an optically active alkamine in the sinister configuration, or a derivative of said alkamine, which is reacted with an 3-X-4-chloro (or RO- where R is hydrogen or an alkali metal)-1,2,5-thiadiazole. Novel 3-morpholino-4-chloro (or RO-)-1,2,5-thiadiazoles and novel alkamines and their preparation also are described.

---

This invention is concerned with a novel and commercially feasible method for preparing the biologically active, S-enantiomer of a 3-X-4-(3-substituted amino-2-hydroxypropoxy)-1,2,5-thiadiazole product. Substantially all of the biological activity of these products resides in the S-enantiomer which was obtained by other workers by the resolution of the racemic product or by the resolution of intermediates employed in their synthesis. These prior methods offer several disadvantages, principally the need to use cyanogen for the synthesis of the intermediate 3-chloro-4-hydroxy-1,2,5-thiadiazole, an important intermediate, as well as the need to resolve the 3-X-4-(3-substituted amino-2-hydroxypropoxy)-1,2,5-thiadiazole derivative thereof. It is well known that resolution procedures are uneconomical as they provide low yields of active material because half of the yield of racemic product formed is of no value, and at least some of the desired isomer is not recoverable by feasible large scale procedures.

This invention therefore is concerned principally with the preparation of optically active 3-X-4-(3-substituted amino-2-hydroxypropoxy)-1,2,5-thiadiazoles utilizing in the synthesis thereof derivatives of optically active carbohydrates thus avoiding all of the difficulties encountered by other workers in the resolution of the end product itself or the need to resolve racemic compound at any stage of the synthesis of the active end products, or the need to employ cyanogen in the syntheses of the thiadiazole starting material.

The invention also is concerned with a novel method for preparing 3-X-4-chloro-1,2,5-thiadiazole and 3-X-4-hydroxy-1,2,5-thiadiazole, as well as a novel method for preparing the optically active R¹-alkamines.

According to the principal process of this invention a 1,2,5-thiadiazole, structure I, is reacted with an optically active alkamine of the sinister (S) configuration, structure II, to provide product III in the sinister configuration. Either structure I compound or structure II compound contains a reactive hydroxyl group or an alkali metal salt thereof; thus the reaction can be illustrated by the following scheme:

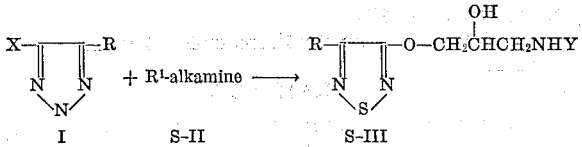

wherein either R or R¹ is the reactive hydroxyl group or an alkali metal salt thereof wherein the alkali metal preferably is sodium or potassium. When R¹ is HO— or (alkali metal—O—) then R is chloro; when R is OH or a salt thereof, then R¹ is the sulfonate or epoxide derivative of the alkamine. X in the above structures represents chloro, lower alkyl having 1 to 3 carbon atoms, lower alkoxy having from 1 to 3 carbon atoms, phenyl, benzyl, morpholino, piperidyl, hydroxypiperidyl, and N-lower alkyl piperazinyl; and Y is a straight or branched chain lower alkyl having from 1 to 5 carbon atoms which is optionally hydroxy substituted.

When in the foregoing reaction scheme R in the thiadiazole I is chloro then the R¹-alkamine advantageously is selected from (A) S-1-(Y-amino)-2,3-dihydroxypropane, or a derivative thereof such as (B) an (S)-oxazolidine of the structure

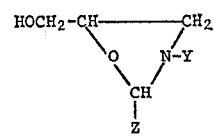

wherein Y has the meaning assigned above and Z is the residue of any known aldehyde; any one of which can be employed in the synthesis of the oxazolidine, or (C) S-2,2'-methylene bis-3-(Y-amino)-1,2-propanediol.

As a modification of the above procedure, the S-oxazolidine can be reacted with a cyanimide of the structure

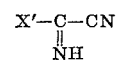

to provide, in situ, the product

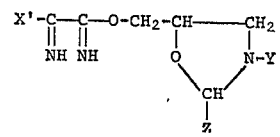

which when treated with sulfur mono- or dichloride gives the thiadiazole intermediate

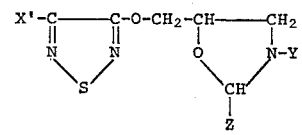

Addition of a base to a solution of this product provides products S–III wherein X' is morpholino, piperidyl, hydroxypiperidyl or N-lower alkylpiperazinyl. The above process advantageously is carried out in the presence of an organic solvent; DMF and ethyl acetate being quite suitable; and either with cooling or with heating, preferably within a temperature range of from 0° to about 100° C. The cyanimide is prepared by known methods by the reaction of cyanogen with morpholine, piperidine, hydroxypiperdine or an N-lower alkylpiperazine.

When R in the thiadiazole reactant I is hydroxy, then the hydroxyl group of the R¹-alkamine is activated by forming a leaving group, i.e., an easily displaceable group, such as a sulfonate of the aforementioned dihydroxypropane or oxazolidines or it is activated by the formation of an epoxide structure.

When R in compound I is chloro and R¹ in compound II represents the reactive hydroxyl group, the optically active product, S–III, is prepared by the reaction of the thiadiazole I and the S-alkamine, S–II, in the presence of a strong base. The reaction preferably is carried out at ambient temperature although the reaction mixture either can be heated up to reflux temperature if desired, or cooled to 0° C. A solvent for the reactants is desirable and any conventional solvent can be employed for this purpose;

suitable ones being polar aprotic solvents such as dimethylformamide (DMF), dimethyl sulfoxide (DMSO), tetrahydrofuran (THF), hexamethylphosphoramide (HMP), lower alkanols and the like. The readily available and relatively inexpensive tert-butanol has been found to be a quite suitable, general purpose solvent for these intermediates. Strong bases that are recommended for use in the reaction are alkali metal alkoxides or alkali metal hydroxides preferably the sodium or potassium alkoxides or hydroxides, or sodium hydride. When product S–III in the form of the free base is obtained as an oil, crystalline material can be prepared by forming the salt by known methods. Suitable salts are those formed with mineral acids or organic acids such as for example the hydrochloride salt, the sulfate salt, the hydrogen maleate salt or other desired mineral or organic acid salt.

When R in compound I represents the reactive hydroxyl group or the alkali metal salt thereof and $R^1$ is an activated hydroxyl group, the reagents are coupled advantageously by combining the reactants in the presence of a solvent to form the desired product, S–III. Heating the reaction mixture up to the reflux temperature can be employed if desired and any of the usual organic solvents can be used, especially suitable ones being polar aprotic solvents, such as DMF, DMSO, THF, HMP, lower $C_{1-5}$ alkanols and the like.

The thiadiazole starting substance I wherein R is (a) chloro (an dthe 3-position substituent is morpholino, a piperidyl or a piperazinyl) or (b) hydroxyl (and the 3-position substituent is X, which has the meaning assigned above) can be made by a novel method that represents another feature of this invention. According to this method, when R in the thiadiazole I is chloro, 3,4-dichloro-1,2,5-thiadiazole is reacted with morpholine, or the selected piperidine or piperazine, preferably with heating from about 80° C. to about 150° C., optionally at about 100° C. to provide 3-morpholino-(piperidyl- or piperazinyl)-4-chloro-1,2,5-thiadiazole. While morpholine, piperidine, or piperazine can be employed in excess for their solvent properties, other conventional organic solvents can be employed for this purpose.

The above procedure also can be employed to replace the 3-chloro substituent by the ($\beta,\beta'$-dihydroxy(diethylamino group which then can be cyclized to the desired morpholino substituent by reaction with less than an equivalent of any sulfonylhalide followed by treatment with a base either at ambient temperature or by heating up to about steam bath temperature. Any known sulfonylhalide can be employed for this purpose, preferred ones being of the type hereinbefore described in relation to the preparation of the sulfonyloxyalkamines. Bases recommended are substantially any basic substances though organic nitrogen bases such as pyridine, lutidine and similar organic bases have been found to be quite suitable. The 3-morpholino group can be similarly formed in the end product S–III when X is chloro.

To prepare the thiadiazole starting substance I wherein R is hydroxyl, 3-X-4-chloro-1,2,5-thiadiazole is combined with aqueous sodium hydroxide or sodium hydroxide in an organic solvent such as a lower $C_{1-5}$ alkanol or aqueous alkanol containing up to 50% of $H_2O$ or DMSO. Heating between about 50° C. to about 100° C. or up to reflux temperature facilitates the reaction. Upon cooling and acidifying the solution with concentrated mineral acid the 3-X-4-hydroxy-1,2,5-thiadiazole precipitates and can be collected by conventional methods.

These novel methods for the preparation of 3-morpholino-(piperidinyl or piperazinyl)-4-chloro-1,2,5-thiadiazole and 3-X-4-hydroxy-1,2,5-thiadiazole provide the desired compound in very high yield.

The $R^1$-alkamines of the sinister configuration, S–II, can be prepared by a novel method that constitutes another feature of this invention. It has been found that S–1, 2-dihydroxy-3-amino (or substituted amino)propane can be made in a single step and in quite good yield by the reductive alkylation of the selected amine with glyceraldehyde. The success of this process was not predictable from the prior art that teaches that glyceraldehyde cyclizes in the presence of base. It was found, however, that reductive alkylation can be effected by hydrogenating a mixture of the selected amine, glyceraldehyde and a hydrogenation catalyst. Hydrogenation advantageously is carried out under a pressure from about 1 to about 10 atmospheres. Any solvent can be employed, suitable ones being tetrahydrofuran, methanol, a mixture of benzene and methanol and the like. Suitable catalysts are platinum, Raney nickel and palladium. While for the present invention one employs an amine of the structure $YNH_2$ and D-glyceraldehyde, it will be appreciated that any amine such as ammonia, a primary or secondary amine, or a nitrogen-containing heterocycle of the structure

can be reductively alkylated with glyceraldehyde by the novel method of this invention.

The S-1,2-dihydroxy-3-amino (or substituted amino)-propane having an activated hydroxy group is prepared by reaction with any known and particularly any commercially available sulfonyl halide. As any sulfonyl halide will activate the hydroxy group and as the sulfonyl moiety is subsequently removed it is not critical that any particular sulfonyl halide be employed to form the sulfonyloxy derivative of the S-1,2-dihydroxy-3-amino (or substituted amino)-propane. For practical purposes, commercially available and inexpensive sulfonyl halides would be employed for this purpose and these would fall into the class of alkylsulfonyl halides and benzenesulfonyl halides wherein the benzene moiety can optionally be substituted with one or more similar or dissimilar substituents selected from lower alkyl, lower alkoxy, halo, amino and nitro substituents. Among the commercially available sulfonyl halides that can be employed for this purpose there can be mentioned methanesulfonyl chloride, benzenesulfonyl chloride, nitrobenzenesulfonyl chloride, bromobenzenesulfonyl chloride, chlorobenzenesulfonyl chloride, toluenesulfonyl chloride, toluenesulfonyl fluoride, trichlorobenzenesulfonyl chloride, tribromobenzenesulfonyl chloride, fluorobenzenesulfonyl chloride, 4-chloro-2 (or 3)-nitrobenzenesulfonyl chloride, hexadecanesulfonyl chloride, 2-mesitylenesulfonyl chloride, methoxybenzenesulfonyl chloride and the like.

The S-oxazolidines are prepared by the reaction of S-1,2-dihydroxy-3-amino (or substituted amino) propane or the S-1-sulfonyloxy-2-hydroxy-3-amino (or substituted amino)-propane with any aldehyde, ZCHO, to provide an S-oxazolidine of the structure

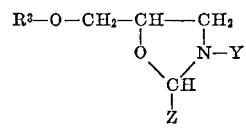

wherein $R^3$ is hydrogen or the sulfonyl group. The aldehyde used in the preparation of the oxazolidine is not critical as any aldehyde can be used in the formation of the cyclic structure which subsequently is cleaved by hydrolysis to remove the

grouping provided by the aldehyde. For practical purposes any commercially available and inexpensive aldehyde can be employed and among these there can be mentioned aliphatic aldehydes, alicyclic, aromatic or heterocyclic aldehydes such as lower alkyl aldehydes, benzaldehyde, phenyl-lower alkyl aldehydes, and the like, the phenyl moiety of either of the latter aldehydes optionally having one or more similar or dissimilar substituents selected from halogen, lower alkyl, halo alkyl, amino, acylamino, mono- or di-alkylamino, nitro, alkoxy, phenalkoxy, halo-alkoxy and hydroxy, a heterocyclic aldehyde optionally having substituents as halogen, lower alkyl, phenalkyl and like. Among the many aldehydes that can be employed there can be mentioned acetaldehyde, propionaldehyde, butyraldehyde, phenylacetaldehyde, anisaldehyde, benzaldehyde, mesitaldehyde, tolualdehyde, furfural and the like. As mentioned above, $R^3$ can be hydrogen or an alkyl-, aryl- or aralkyl-sulfonate of the type hereinabove described as suitable for preparing the sulfonyl derivatives of S-1,2-dihydroxy-3-amino (or substituted amino) propane. When R is hydrogen, the sulfonate of the 5-hydroxymethyloxazolidine can be prepared by reaction with the desired sulfonyl halide in substantially the same manner as described above.

The S-2,3-epoxy-1-amino (or substituted amino)-propanes are prepared by treating a 1-sulfonyloxy-2-hydroxy-3-amino (or substituted amino) propane with a strong base. The epoxide either in the form of its free base or as a salt thereof can be reacted with the 1,2,5-thiadiazole to give product S–III. The nature of the salt is again not critical. Inorganic acids or organic acids can be employed to prepare the salt of the epoxide compound, usually hydrochloric, sulfuric, maleic, D-10-camphor sulfonic acids and the like are used for this purpose.

Preparation of S-3-X-4-[3-(Y-amino)-2-hydroxypropoxy]-1,2,5-thiadiazole via 3-X-4-chloro-1,2,5-thiadiazole

EXAMPLE 1

Step A.—Preparation of S(—)-glycolamine

A mixture of tert-butylamine (37.44 g.; 0.513 mole), methanol (150 ml.) and 5% palladium-on-carbon (1.0 g.) is shaken in a hydrogenation bomb under three atmospheres hydrogen pressure. A solution of D-glyceraldehyde (15 g.) in methanol (60 ml.) is added over a one hour period during hydrogenation. After the addition, the mixture is shaken for an additional 15 hours. The catalyst is removed by filtration and the solvent evaporated in vacuo yielding S(—)-1,2-dihydroxy-3-tert-butylaminopropane [S(—)-glycolamine] in the form of an oil which is crystallized by trituration with ether to give 11.0 g. (45%) yield of product, M.P. 80–82° C. $[\alpha]_D^{-30.1}$ (1 N aqueous HCl).

By replacing the tert-butylamine employed in Step A by an equivalent quantity of isopropylamine, 2,2-dimethylpropylamine, and 1,1-dimethyl-2-hydroxyethylamine and following substantially the same procedure described in Step A, there is obtained, respectively, S-1,2-dihydroxy-3-isopropylaminopropane,
S-1,2-dihydroxy-3-(2,2-dimethylpropylamino)propane, and
S-1,2-dihydroxy-3-(1,1-dimethyl-2-hydroxyethylamino) propane.

S(—)-glycolamine also can be prepared by the following method:

Preparation of S(—)-glycolamine from isopropylidene-D-glyceraldehyde.—Isopropylidene-D-glyceraldehyde (0.276 mole) in 35 ml. of cold tetrahydrofuran is added, with ice bath cooling, over a one-hour period during hydrogenation to a mixture of tert-butylamine (103 ml.), methanol (103 ml.) and 5% palladium-on-carbon (7.2 g.) in an hydrogenation apparatus under 3 atmospheres hydrogen pressure. The mixture is hydrogenated at ambient temperature until the absorption of hydrogen ceases. The catalyst then is removed by filtration and washed with methanol (52 ml.) and the combined filtrates treated with 6N hydrochloric acid (350 ml.) with cooling. The mixture then is distilled until a vapor temperature of 98±1° C. is reached and then refluxed one hour. The solution then is cooled to 0° C. and treated with sodium hydroxide pellets (140 g.) keeping the temperature under 35° C. Thereafter the mixture is treated with water (140 ml.) and extracted with four 175 ml. portions of methylene chloride. The combined extracts are dried over magnesium sulfate and evaporated to a thick crystalline slurry which is flushed twice with ether (50 ml.) and filtered at 0–5° C. After drying at 35° C. in vacuo there is obtained 28.5 g. (70%) of S(—)-glycolamine.

Another method by which S(—)-glycolamine can be prepared will be described in Example 6.

Step B.—Preparation of 3-morpholino-4-chloro-1,2,5-thiadiazole 3,4-dichloro-1,2,5-thiadiazole (100.0 g.; 0.645 mole) is added dropwise over a 30-minute period at 105–110° C. to morpholine (224 ml.; 2.58 mole). After the addition, the mixture is stirred 2 hours at 105–110° C., then cooled to 15° C. and quenched with water (250 ml.). This mixture then is made acidic with concentrated hydrochloric acid (250 ml.) whereupon an insoluble oil soon crystallizes to a heavy solid mass. After crystallization is complete the solid is filtered and washed with water and then dried at 35° C. in vacuo yielding 125.5 g. (95%) of 3-morpholino-4-chloro-1,2,5 thiadiazole, M.P. 43–45° C.

By replacing morpholine in the above reaction with an equivalent quantity of N-methylpiperazine, piperidine and 4-hydroxypiperidine and then following substantially the same method there is obtained, respectively 3-(4-methylpiperazinyl)-4-chloro-1,2,5-thiadiazole,
3-piperidyl-4-chloro-1,2,5-thiadiazole, and
3-(4-hydroxypiperidyl)-4-chloro-1,2,5-thiadiazole.

Step C.—Preparation of S(—)-3-morpholino-4-(3-tert-butylamino-2-hydroxypropoxy)-1,2,5 - thiadiazole and its hydrogen maleate salt A mixture of 3 - morpholino - 4 - chloro-1,2,5-thiadiazole (20.57 g.) and S(—)-glycolamine (14.72 g.) in anhydrous tert-butanol (50 ml.) is heated to reflux under a nitrogen atmosphere. A solution of potassium tert-butoxide in tert-butanol (100 ml. of 1M solution or equivalent) is added in 10 ml. portions and the mixture refluxed 10 minutes between additions. After the last addition the mixture is refluxed an additional 10 minutes, then cooled to 60° C., and treated with 6 N hydrochloric acid (50 ml.) in a thin stream while maintaining good cooling. An additional 50 ml. of water is added and the tert-butanol is evaporated in vacuo leaving an oil-water residue. This residue is extracted with one 50 ml. portion and one 20 ml. portion of methylene chloride and the combined organic layers are backwashed with two 50 ml. portions of 4 N hydrochloric acid. The combined acid layers are made alkaline with excess potassium carbonate (approximately 80 g.) and extracted with two 50 ml. portions of ether. The combined ether layers are washed with two 20 ml. portions of water, dried over magnesium sulfate and evaporated in vacuo to give 13.7 g. of S(—)-3-morpholino - 4 - (3 - tert-butylamino-2-hydroxypropoxy)-1,2,5-thiadiazole in the form of an oil.

This oil is dissolved in 50 ml. of tetrahydrofuran, treated with charcoal (1.5 g.), filtered, and the cake washed with 20 ml. of tetrahydrofuran. To this solution is added maleic acid [5.0 g.; 1 mole equivalent per mole of S(—)-3-morpholino - 4 - (3 - tert-butylamino-2-hydroxypropoxy) - 1,2,5 - thiadiazole] dissolved in tetrahydrofuran (25 ml.). The mixture then is seeded and aged one hour at 25° C. The crystallized hydrogen maleate salt is separated by filtration, washed with tetrahydrofuran and dried at 50° C. in vacuo to give 7.3 g. of S(—)-3-morpholino - 4 - (3-tert-butylamino-2-hydroxypropoxy)-1,2,5-thiadiazole hydrogen maleate, M.P. 195–198° C. (sample inserted at 190° C. and heated at rate of 3°/min.), $[\alpha]_{405}$ —12° [c.=4, 1 N HCl], equivalent weight 429–431 (titrated with base), calculated 432.

By replacing the maleic acid employed in the above procedure by hydrochloric acid, sulfuric acid, tartaric acid or any other desired acid the corresponding acid salt is formed. When sulfuric acid is employed in the ratio of 1 mole of acid to 2 moles of thiadiazole the sulfate salt of S(—) - 3-morpholino-4-(3-tert-butylamino-2-hydroxypropoxy)-1,2,5-thiadiazole is obtained, M.P. 253.5–254° C. [α]₄₀₅ —13.8° [c.=1, 1 N HCl].

By employing quantities of the following reaction pairs (1) 3-morpholino-4-chloro-1,2,5-thiadiazole and S-1,2-dihydroxy-3-isopropylaminopropane,
(2) 3-(4-methylpiperazinyl)-4-chloro-1,2,5-thiadiazole and S(—)-glycolamine,
(3) 3-piperidyl-4-chloro-1,2,5-thiadiazole and S-1,2-dihydroxy-3-isopropylaminopropane,
(4) 3-piperidyl-4-chloro-1,2,5-thiadiazole and S(—)-glycolamine, and
(5) 3-(4-hydroxypiperidyl)-4-chloro-1,2,5-thiadiazole and S(—)-glycolamine equivalent to the quantity used in Step C and following substantially the same procedure described in Step C, there is obtained, respectively, (1) S-3-morpholino-4-(3-isopropylamino-2-hydroxypropoxy)-1,2,5-thiadiazole and its hydrogen maleate salt,
(2) S-3-(4-methylpiperazinyl)-4-(3-tert-butylamino-2-hydroxypropoxy)-1,2,5-thiadiazole and its hydrogen maleate salt,
(3) S-3-(piperidyl-4-(3-isopropylamino-2-hydroxypropoxy)-1,2,5-thiadiazole and its hydrogen maleate salt,
(4) S-3-piperidyl-4-(3-tert-butylamino-2-hydroxypropoxy)-1,2,5-thiadiazole and its hydrogen maleate salt, and
(5) S-3-(4-hydroxypiperidyl)-4-(3-tert-butylamino)-2-hydroxypropoxy)-1,2,5-thiadiazole and its hydrogen maleate salt.

EXAMPLE 2

Step A.—Preparation of S-3-tert-butyl-5-hydroxymethyloxazolidine

A mixture of S(—)-glycolamine (29.4 g.; 0.2 mole), aqueous formaldehyde (20 ml. of 37% solution) and benzene (80 ml.) is heated under reflux with continuous removal of water for two hours. The solvent then is evaporated in vacuo (15 mm. pressure) and the oily residue distilled, B.P. 80–82° C., (0.5 mm. pressure) providing 29.9 g. (94%) S-3-tert-butyl-5-hydroxymethyloxazolidine.

Step B.—Prepration of S(—) - 3 - morpholino - 4 - (3-tert - butylamino - 2 - hydroxypropoxy) - 1,2,5 - thiadiazole and its hydrogen maloate salt A mixture of 3-morpholino-4-chloro-1,2,5-thiadiazole (2.05 g.; 10 mmole), S-3-tert-butyl-5-hydroxymethyloxazolidine (10 mmole) and potassium tert-butoxide in tert-butanol (11.7 ml. of 0.885 N, 10 mmole) is stirred at 25° C. for 16 hours. The solvent then is evaporated in vacuo and the residue treated with 20 ml. of 1 N hydrochloric acid. The mixture is heated at 65° C. for one-half hour, cooled to 25° C. and extracted with ether. The aqueous layer is made alkaline with potassium carbonate and extracted with ether. The extracts are washed with water, dried and evaporated to an oily residue of S(—)-3 - morpholino - 4 - (3 - tert-butylamino-2-hydroxypropoxy)-1,2,5-thiadiazole. This oil is 10 ml. of tetrahydrofuran is converted to the crystalline hydrogen maleate salt by treatment with an equivalent amount of maleic acid by the procedure described in Example 1, Step B, to provide a 30% yield of S(—)-3-morpholino-4-(3-tert-butylamino - 2 - hydroxypropoxy)-1,2,5-thiadiazole hydrogen maleate.

EXAMPLE 3

Step A.—Preparation of S-2-isopropyl-3-tert-butyl-5-hydroxymethyloxazolidine

A mixture S(—)-glycolamine (10 g.; 68 mmole) in freshly distilled isobutyraldehyde (50 ml.) is heated under reflux with continuous removal of water for 2 hours. The solvent then is removed in vacuo and the oily residue distilled. A forerun of 0.85 g. of material with B.P. 70–75° C. (0.1 mm. pressure) is obtained which is 98% pure S - 2 - isopropyl - 3 - tert-butyl-5-hydroxymethyloxazolidine when analyzed by vapor pressure chromotography (VPC).

Step B.—Preparation of S(—) - 3 - morpholino - 4 - (3-tert - butylamino - 2 - hydroxypropoxy)-1,2,5-thiadiazole and its hydrogen maleate salt This product is obtained in 35% yield by following the procedure described in Example 2, Step B, with the exception that 10 mmole of S-2-isopropyl-3-tert-butyl-5-hydroxymethyloxazolidine is substituted for the oxazolidine employed in Example 2, Step B.

EXAMPLE 4

Step A.—Preparation of S-2-phenyl-3-tert-butyl-5-hydroxymethyloxazolidine

A mixture of S(—)-glycolamine (20 g.; 0.136 mole), benzaldehyde (50 ml.; 288 mmole) and benzene (30 ml.) is heated under reflux for 8 hours while removing the water as formed into a Dean Stark trap filled with benzene. The temperature of the reaction mixture is maintained at 110–113° C. over the entire period. The benzene is removed in vacuo (15 mm. pressure) and the excess benzaldehyde is removed by distillation at 0.1 mm. pressure. The residual oil (31.9 g.; 99% yield) is 90% pure S-2-phenyl-3-tert-butyl-5-hydroxymethyloxazoline by VPC and can be used directly in the next step. If desired, the oxazolidine can be distilled (105–108° C.; 0.002 mm. pressure) to provide 96% pure product.

Step B.—Preparation of S(—) - 3 - morpholino - 4 - (3-tert-butylamino - 2 - hydroxypropoxy) - 1,2,5 - thiadiazole and its hydrogen maleate salt The above product is prepared in 50% yield by the process described in Example 2, Step B, except 10 mmole of S - 2 - phenyl - 3 - tert-butyl-5-hydroxymethyloxazolidine is substituted for the oxazolidine employed in Example 2, Step B.

Any other aldehyde, particularly (though not necessarily) any of the commercially available aldehydes identified hereinabove can be reacted with an S-1,2-dihydroxy-3-amino( or substituted amino propane or an S-1-sulfonyloxy-2-hydroxy-3-amino( or substituted amino)propane by the method illustrated in Step A of Examples 2, 3 or 4, to provide the desired oxazolidine which then can be reacted with the appropriate 1,2,5-thiadiazole by the procedure of Example 2, Step B or Example 9, Step B, to give product S–III.

EXAMPLE 5

Step A.—Preparation of S-2,2′-methylene bs-3-tert-butylamino-1,2-propanediol (S-bisamine)

A solution of 2,5-methylene-D-mannitol (6.0 g.; 0.031 mole) in anhydrous methanol (75 ml.) is prepared and cooled to 0–5° C. This solution is stirred while adding lead tetraacetate (13.7 g.; 0.031 mole) and while maintaining the temperature at about 10° C. After the oxidant has been added, the mixture is aged 1 hour at 10° C. whereupon it was found by testing with starch-iodide paper that the oxidant had been completely consumed. The reaction mixture then is cooled to 0° C. and tetramethylammonium chloride (7.2 g.; 0.066 mole) is added. The reaction mixture is aged an additional hour at 0–5° C. and then filtered cold. The filter cake is washed with two 10 ml. portions of precooled anhydrous methanol, the filtrates combined and added dropwise to a mixture of tert-butylamine (11.3 g.; 0.155 mole) in anhydrous methanol (12 ml.) while hydrogenating at an initial pressure of 40 p.s.i. over palladium-on-carbon (1.2 g. of 5%). The addition rate is such that about 1 hour is required for the addition. The reduction is continued until until 1 hour after hydrogen uptake ceases (generally 6–10 hours in all). The reaction then is filtered free of catalyst, the catalyst washed with 20 ml. of anhydrous methanol and the combined filtrates then evaporated in vacuo to a volume of about 25 ml. This residue is treated with a solution of sodium carbonate (14.8 g.; 0.14 mole) in water (75 ml.) and the solution then extracted with three 30 ml. portions of methylene chloride. After drying over magnesium sulfate, evaporation of the methylene chloride extracts in vacuo leaves a viscous colorless oil that slowly crystallizes yielding 8.75 g. (92.5% yield) of S - 2,2' - methylene bis - 3 - tert-butylamino-1,2-propanediol (S-bisamine) which by VPC is found to be 95% pure. A sample obtained by recrystallization from n-heptane melts at 62–63.5° C.

Analysis.—Calculated for $C_{15}H_{34}N_2O_4$ (percent): C, 58.78; H, 11.18; N, 9.14. Found (percent): C, 58.59; H, 10.90; N, 9.32.

Step B.—Preparation of S(—)-3-morpholino-4-(3-tert-butylamino-2-hydroxypropoxy)-1,2,5-thiadiazole and its hydrogen maleate salt A solution of 3-morpholino-4-chloro-1,2,5-thiadiazole (2.06 g.; 0.01 mole) and S-bisamine (1.53 g.; 0.005 mole) in anhydrous dimethylformamide (15 ml.) is cooled to 0° C. To the solution is added sodium hydride (0.21 g.; 0.005 mole of 56.8% NaH). Stirring is continued while maintaining the temperature between 0–5° C. When testing with phenolphthalein paper shows the absence of strong base, a second portion of sodium hydride (0.21 g.) is added. After an additional hour, the reaction is quenched on 30 ml. of 4.0 N hydrochloric acid and extracted with two 50 ml. portions of ether. The aqueous solution then is refluxed for 2 hours, cooled, and the solution brought to ca. pH 9 with concentrated ammonium hydroxide and then extracted with three 40 ml. portions of methylene chloride. After drying over magnesium sulfate and evaporation in vacuo there is obtained 2.29 g. (72.5% yield) of S(—)-3-morpholino-4-(3-tert-butylamino)-2-hydroxypropoxy)-1,2,5-thiadiazole. This is converted to its hydrogen maleate salt by treatment with maleic acid (0.85 g.; 0.0073 mole) in tetrahydrofuran (3 ml.) by substantially the same procedure described in Example 2, Step B, to give 2.14 g. (49.5%) of S(—)-3-morpholino - 4 - (3-tert-butylamino)-2-hydroxypropoxy)-1,2,5-thiadiazole hydrogen maleate.

EXAMPLE 6

A solution of 2.5 g. (0.0059 mole) S-bisamine maleate (or the free base thereof), prepared as described in Example 5, Step A, in 15 ml. 4.0 N hydrochloric acid is refluxed for 1½ hours. The clear solution is cooled to 0° C. and made basic with concentrated ammonia water, followed by 8 g. sodium hydroxide. This solution is then extracted with five 25 ml. portions of methylene chloride and the extracts dried over magnesium sulfate and concentrated in vacuo to a residue of 1.47 g. (85%) of colorless S(—)-glycolamine, M.P. 81.5–83° C.

EXAMPLE 7

Step A.—Preparation of S(—)-glycolamine-1-toluenesulfonate

A solution of S(—)-glycolamine (4.0 g.), prepared as described in Example 1, Step A, and pyridine hydrochloride (3.14 g.) in pyridine (8 ml.) is treated with p-toluenesulfonyl chloride (5.31 g.). The mixture is stirred for one-half hour at 25–30° C. and then poured into 50 ml. of cold water. The solution is treated with potassium carbonate (1.92 g.) and the pyridine evaporated in vacuo at a temperature between 55–60° C. The aqueous residue is treated with potassium carbonate (4.5 g.) and the mixture extracted with methylene chloride (50 ml.). Evaporation of the dried extract provides 6.2 g. (75% yield) of S(—)-glycolamine-1-toluenesulfonate [S(—)-1-toluenesulfonyloxy - 2 - hydroxy-3-tert-butylaminopropane], M.P. 91–93° C.

By replacing the S(—)-glycolamine and the p-toluenesulfonyl chloride by equivalent quantities of the following reaction pairs:

(1) S-1,2-dihydroxy-3-isopropylaminopropane and benzenesulfonyl chloride,
(2) S-1,2-dihydroxy-3-(2,2 - dimethylpropylamino)propane and methylsulfonyl chloride and/or other lower alkylsulfonyl chloride,
(3) S-1,2-dihydroxy-3-(1,1-dimethyl-2 - hydroxyethylamino)propane and p-chlorophenylsulfonyl chloride, there is obtained respectively, (1) S-1-benzenesulfonyloxy-2-hydroxy-3-isopropylaminopropane,
(2) S-1-methylsulfonyloxy-2-hydroxy-3-(2,2-dimethylpropylamino)propane or other lower alkylsulfonyloxy derivative, and
(3) S-1-(p-chlorophenylsulfonyloxy)-2-hydroxy - 3 - (1,1-dimethyl-2-hydroxyethylamino)propane.

Any other sulfonyl halide, particularly (though not necessarily) any of the commercially available sulfonyl halides identified hereinabove can be employed with equal success if substituted in the process illustrated in Step A of this example for reaction with any desired S-1,2-dihydroxy-3-amino(or substituted amino)propane or S-5-hydroxymethyloxazolidine to provide the sulfonyloxy derivatives thereof which upon reaction with the appropriate 1,2,5-thiadiazole according to Step C of this example or Step B of Example 9 gives product S–III.

Step B.—Preparation of 3-morpholino-4-hydroxy-1,2,5-thiadiazole 3-morpholino-4-chloro-1,2,5-thiadiazole (125.5 g.) prepared as described in Example 1, Step B, is added to 2.5 N sodium hydroxide (1 liter) in dimethyl sulfoxide (100 ml.). The mixture is refluxed with stirring for about 3 hours and the solution then is cooled to 15° C. and made acidic with concentrated hydrochloric acid (250 ml.). The precipitated material is removed by filtration at 15° C. and slurried well with water. The solid material then is dried to constant weight thus providing 108.7 g. of 3-morpholino-4-hydroxy-1,2,5-thiadiazole, M.P. 198–200° C. (dec.).

Step C.—Preparation of S(—)-3-morpholino-4-(3-tert-butylamino-2-hydroxypropoxy)-1,2,5-thiadiazole S(—)-glycolamine-1-toluenesulfonate (3.45 g.; 11.45 mmole) is added to 0.805 N methanolic sodium methoxide (15 ml.) at 0° C. The mixture is stirred for 15 minutes at 0–5° C., treated with 3-morpholino-4-hydroxy-1,2,5-thiadiazole (4.29 g.) and then refluxed for 16 hours. The solvent is evaporated in vacuo and the residue treated with excess potassium carbonate. The insoluble oil is extracted with ether, the ether extracts dried and evaporated to provide S(—)-3-morpholino-4-(3-tert-butylamino-2-hydroxypropoxy)-1,2,5-thiadiazole in 35% yield.

By replacing the S(—)-glycolamine-1-toluenesulfonate and the 3-morpholino-4-hydroxy-1,2,5-thiadiazole employed in Step C by equivalent quantities of the following reaction pairs:

(1) S(—)-glycolamine-1-toluenesulfonate and 3-chloro-4-hydroxy-1,2,5-thiadiazole or its alkali metal salt,
(2) S-1-benzenesulfonyloxy-2-hydroxy-3-isopropylaminopropane and 3-chloro-4-hydroxy-1,2,5-thiadiazole or its alkali metal salt,
(3) S-1-benzenesulfonyloxy-2-hydroxy-3-isopropylaminopropane and 3-ethyl-4-hydroxy-1,2,5-thiadiazole or its alkali metal salt,
(4) S(—)-glycolamine-1-toluenesulfonate and 3-ethyl-4-hydroxy-1,2,5-thiadiazole or its alkali metal salt, (5) S-1-(p-chlorophenylsulfonyloxy)-2-hydroxy-3-(1,1-dimethyl-2-hydroxyethylamino)propane and 3-ethyl-4-hydroxy-1,2,5-thiadiazole or its alkali metal salt,
(6) S-1-benzenesulfonyloxy-2-hydroxy-3-isopropylaminopropane and 3-ethoxy-4-hydroxy-1,2,5-thiadiazole or its alkali metal salt,
(7) S(—)-glycolamine-1-toluenesulfonate and 3-ethoxy-4-hydroxy-1,2,5-thiadiazole or its alkali metal salt,
(8) S-1-methylsulfonyloxy-2-hydroxy-3-(2,2-dimethylpropylamino)propane or other lower alkylsulfonyloxy derivative and 3-ethoxy-4-hydroxy-1,2,5-thiadiazole or its alkali metal salt,
(9) S-1-benzenesulfonyloxy-2-hydroxy-3-isopropylaminopropane and 3-phenyl-4-hydroxy-1,2,5-thiadiazole or its alkali metal salt,
(10) S(—)-glycolamine-1-toluenesulfonate and 3-phenyl-4-hydroxy-1,2,5-thiadiazole or its alkali metal salt,
(11) S(—)-glycolamine-1-toluenesulfonate and 3-benzyl-4-hydroxy-1,2,5-thiadiazole or its alkali metal salt, and following substantially the same procedure described in Step C of Example 7, there is obtained respectively, (1) S-3-chloro-4-(3-tert-butylamino-2-hydroxypropoxy)-1,2,5-thiadiazole,
(2) S-3-chloro-4-(3-isopropylamino-2-hydroxypropoxy)-1,2,5-thiadiazole,
(3) S-3-ethyl-4-(3-isopropylamino-2-hydroxypropoxy)-1,2,5-thiadiazole,
(4) S-3-ethyl-4-(3-tert-butylamino-2-hydroxypropoxy)-1,2,5-thiadiazole,
(5) S-3-ethyl-4-[3-(1,1-dimethyl-2-hydroxyethylamino)-2-hydroxypropoxy]-1,2,5-thiadiazole.
(6) S-3-ethoxy-4-(3-isopropylamino-2-hydroxypropoxy)-1,2,5-thiadiazole,
(7) S-3-ethoxy-4-(3-tert-butylamino-2-hydroxypropoxy)-1,2,5-thiadiazole,
(8) S-3-ethoxy-4-[3-(2,2-dimethylpropylamino)-2-hydroxypropoxy]-1,2,5-thiadiazole,
(9) S-3-phenyl-4-(3-isopropylamino-2-hydroxypropoxy)-1,2,5-thiadiazole,
(10) S-3-phenyl-4-(3-tert-butylamino-2-hydroxypropoxy)-1,2,5-thiadiazole,
(11) S-3-benzyl-4-(3-tert-butylamino-2-hydroxypropoxy)-1,2,5-thiadiazole,

EXAMPLE 8

Step A.—Preparation of S(—)-2,3-epoxy-1-tert-butylaminopropane D-10-camphor sulfonate A solution of S(—)-glycolamine-1-toluenesulfonate (2.0 g.; 0.0066 mole), prepared as described in Example 7, Step A, in anhydrous benzene (30 ml.) is treated with fresh sodium methoxide (0.39 g.; 0.0073 mole). This mixture is digested 2.5 hours at room temperature and then filtered free of insolubles; these insolubles then being washed with benzene (10 ml.). The combined filtrates are treated with a solution of D-10-camphor sulfonic acid (1.62 g.; 0.0070 mole) in acetone (10 ml.), seeded with a crystal of partially resolved epoxide salt and evaporated to a volume of 20 ml. under an inert atmosphere to give 0.95 g. (38.5% yield) of S(—)-2,3-epoxy-tert-butylaminopropane D-10-camphor sulfonate, M.P. 141–142° C.

By replacing the S(—)-glycolamine-1-toluenesulfonate employed in Step A by an equivalent quantity of (1) S-1-benzensulfonyloxy-2-hydroxy-3-isopropylaminopropane,
(2) S-1-methylsulfonyloxy-2-hydroxy-3-(2,2-dimethylpropylamino)propane or other lower alkylsulfonyloxy derivative, and
(3) S-1-(p-chlorophenylsulfonyloxy)-2-hydroxy-3-(1,1-dimethyl-2-hydroxyethylamino)propane and following substantially the same procedure described in Step A there is obtained, respectively (1) S-2,3-epoxy-1-isopropylaminopropane D-10-camphorsulfonate salt
(2) S-2,3-epoxy-1-(2,2-dimethylpropylamino)propane D-10-camphorsulfonate salt, and
(3) S-2,3-epoxy-1-(1,1-dimethyl-2-hydroxyethylamino)-propane D-10-camphorsulfonate salt.

Other inorganic or organic salts of these epoxides can be prepared by replacing the D-10-camphor sulfonic acid by any desired acid such as hydrochloric, sulfuric, maleic, tartaric or other selected acid, and those as well as other salts can be employed in the following step to prepare the S(—)-3-morpholino-4-(3-tert-butylamino-2-hydroxypropoxy)-1,2,5-thiadiazole.

Step B.—Preparation of S(—)-3-morpholino-4-(3-tert-butylamino-2-hydroxypropoxy)-1,2,5-thiadiazole and its hydrogen maleate salt To a mixture of the sodium salt of 3-morpholino-4-hydroxy-1,2,5-thiadiazole (0.52 g.; 0.0025 mole), prepared by treating 3-morpholino-4-hydroxy-1,2,5-thiadiazole with methanolic sodium hydroxide) and 3-morpholino-4-hydroxy-1,2,5-thiadiazole (0.47 g.; 0.0025 mole) in anhydrous dimethyl sulfoxide (2 ml.) there is added S(—)-2,3-epoxy-1-tert-butylaminopropane D-10-camphor sulfonate (0.92 g.; 0.0025 mole). The mixture is stirred at room temperature for about 4 days and then quenched on 35 ml. of ice water. The solution then is brought to ca. pH 9 with sodium carbonate and extracted with three 40 ml. portions of methylene chloride. The methylene chloride extracts then are back-extracted with distilled water (20 ml.). After magnesium sulfate drying and evaporation in vacuo there is obtained 0.47 g. (60% yield) of S(—)-3-morpholino-4-(3-tert-butylamino-2-hydroxypropoxy)1,2,5 - thiadiazole. This product is taken up in tetrahydrofuran (8 ml.) and added to a solution of maleic acid (0.28 g.; 0.0025 mole) in tetrahydrofuran (3 ml.). After aging one hour at 25° C. the resulting precipitate is collected and dried in vacuo yielding 0.63 g. (58.5%) of S(—)-3-morpholino - 4 - (3 - tert - butylamino-2-hydroxypropoxy)-1,2,5-thiadiazole hydrogen maleate.

By replacing the S(—)-2,3-epoxy-1-tert-butylaminopropane and D-10-camphorsulfonate salt employed in Step B by the same molecular amount of S(—)-2,3-epoxy-1-tert-butylaminopropane and following the same procedure there described, there is obtained an equivalent yield of S(—) - 3 - morpholino - 4 - (3 - tert - butylamino-2-hydroxypropoxy)-1,2,5-thiadiazole.

Other S - 3 - morpholino-4-(3-substituted amino-2-hydroxypropoxy)-1,2,5-thiadiazoles and their hydrogen maleate salt are obtained when the S(—)-2,3-epoxy-tert-butylaminopropane D-10-camphorsulfonate salt is replaced in the above procedure by an equivalent quantity of one or another of the following reactants:

(1) S-2,3-epoxy-1-isopropylaminopropane D-10-camphorsulfonate salt,
(2) S-2,3-epoxy-1-(2,2-dimethylpropylamino)propane D-10-camphorsulfonate salt, and
(3) S-2,3-epoxy-1-(1,1-dimethyl-2-hydroxyethylamino)-propane and D-10-camphorsulfonate salt, whereupon there is obtained, respectively (1) S-3-morpholino-4-(3-isopropylamino-2-hydroxypropoxy)-1,2,5-thiadiazole
(2) S-3-morpholino-4-[3-(2,2-dimethylpropylamino)-2-hydroxypropoxy]-1,2,5-thiadiazole
(3) S-3-morpholino-4-[3-(1,1-dimethyl-2-hydroxyethylamino)-2-hydroxypropoxy]-1,2,5-thiadiazole Step A.—Preparation of S-3-tert-butyl-5-(benzenesulfonyloxymethyl)oxazolidine To a solution of S-3-tert-butyl-5-hydroxymethyloxazolidine (1.59 g.; 10 mmole), prepared as described in Example 2, Step A, in pyridine (3 ml.) there is added benzenesulfonyl chloride (10 mmole) and the mixture stirred for about 1 hour at 25° C. Ether (20 ml.) is added whereupon S - 3 - tert - butyl-5-(benzenesulfonyloxymethyl)-oxazolidine hydrochloride is precipitated, removed by filtration and washed well with ether and dried in vacuo at 40° C.

The same oxazolidine product is obtained by replacing the S(—)-glycolamine employed in Example 2, Step A, by equivalent quantity of S-1-benzenesulfonyloxy-2-hydroxy-3-tert-butylaminopropone and then following substantially the procedure described in Step A of Example 2.

By replacing the benzenesulfonyl chloride employed in Step A by 10 mmole of p-tolylsulfonyl chloride, p-nitrobenzenesulfonyl chloride, and p-bromobenzenesulfonyl chloride there is obtained respectively:

S-3-tert-butyl-5-(p-toluenesulfonyloxymethyl)oxazolidine, M.P. 143.5–145° C., yield 83.5%
S-3-tert-butyl-5-(p-nitrobenzenesulfonyloxymethyl)-oxazolidine, yield 98%
S-3-tert-butyl-5-(p-bromobenzenesulfonyloxymethyl)-oxazolidine, M.P. 118–120° C., yield 95%

Step B

S - 3 - tert - butyl - 5 - (benzenesulfonyloxymethyl) oxazolidine (10 mmole) are dissolved in benzene (12 ml.) and tetrahydrofuran (0.9 ml.). The sodium salt of 3-morpholino-4-hydroxy-1,2,5-thiadiazole (10 mmole) is added and the mixture refluxed for 16 hours. The reaction mixture then is extracted with three 10 ml. portions of 1 N hydrochloric acid and the aqueous layer then made alkaline with ammonia and extracted with three 10 ml. portions of benzene. The combined benzene extracts are dried and evaporated to give S(—)-3-morpholino-4-(3-tert-butylamino-2-hydroxypropoxy)-1,2,5-thiadiazole. This product is converted to the hydrogen maleate salt by treatment with maleic acid in tetrahydrofuran by substantially the same procedure described in Example 1, Step C, to provide a 32% yield of S(—)-3-morpholino - 4 - (3-tert-butylamino-2-hydroxypropoxy) - 1,2,5 - thiadiazole hydrogen maleate.

By replacing the S-3-tert-butyl-5-(benzenesulfonyloxymethyl)oxazolidine employed in Step B by an equimolecular quantity of S-3-tert-butyl-5-(p-toluenesulfonyloxymethyl)-oxazolidine,
S-3-tert-butyl-5-(p-nitrobenzenesulfonyloxymethyl) oxazolidine, and
S-3-tert-butyl-5-(p-bromobenzenesulfonyloxymethyl)-oxazolidine and following substantially the same procedure described in Step B above there is obtained the free base and the hydrogen maleate salt of S(—)-3-morpholino-4-(3-tert-butylamino-2-hydroxypropoxy) - 1,2,5 - thiadiazole in substantially the same yield.

The following examples illustrate the modification of the principal methods of this invention wherein the 3-(β,β-dihydroxy)diethylamino group is cyclized to the morpholino substituent (Example 10) and wherein the thiadiazole nucleus is synthesized during the procedure for making an S–III product having a 3-X′-substituent of the type hereinbefore described (Example 11).

EXAMPLE 10

Step A.—Preparation of 3-[(β,β′-dihydroxy)diethylamino]-4-(3-tert-butylamino - 2 - hydroxypropoxy) - 1,2,5-thiadiazole A mixture of 1.0 mole S-3-chloro-4-(3-tert-butylamino-2-hydroxypropoxy)-1,2,5-thiadiazole hydrochloride and 20 moles diethanolamine is heated at 125–135° C. for four hours and then cooled overnight. The precipitated diethanolamine hydrochloride is separated and the filtrate concentrated in vacuo to an oil. The oil is shaken with a mixture of ether and aqueous sodium carbonate. After separation, the ether extract is dried over sodium sulfate and evaporated to give crude S-3-[β,β′-dihydroxy)diethylamino]-4-(3-tert-butylamino - 2 - hydroxypropoxy)-1,2,5-thiadiazole.

Step B.—Preparation of S-3-morpholino-4-(3-tert-butylamino-2-hydroxypropoxy)-1,2,5-thiadiazole A solution of 1 mole of the thus obtained product in 335 ml. ether and 85 ml. anhydrous pyridine is prepared and cooled to 5° C. Then 0.33 mole of benzene sulfonyl chloride is added dropwise over a three-hour period, keeping the temperature at 5° C. Stirring is continued an additional hour. The solution is then extracted several times with water and the organic layer dried over sodium sulfate. Concentration of the organic layer in vacuo gives a viscous gum. The gum is dissolved in 0.45 mole of 2,6-lutidine and heated for one hour. Evaporation in vacuo of excess 2,6-lutidine leaves a gummy residue. This residue is shaken with a mixture of 300 ml. of ether and 300 ml. of aqueous sodium carbonate. After separation and drying, evaporation of the ether layer gives S-3-morpholino-4-(3-tert-butylamino-2-hydroxypropoxy)-1,2,5-thiadiazole.

By replacing the S-3-chloro-4-(β-tert-butylamino-2-hydroxypropoxy)-1,2,5-thiadiazole employed in Step A by any other S-3-chloro-4-[3-(Y-amino)-2-hydroxypropoxy)-1,2,5-thiadiazole and following substantially the same procedure described in Steps A and B there is obtained the corresponding S - 3 - morpholino-4-[3-(Y - amino)-2-hydroxypropoxy)-1,2,5-thiadiazole where in Y represents one of the hereinbefore identified groups.

EXAMPLE 11

A solution of 5.2 g. of cyanogen (0.1 mole) in 60 ml. of DMF is treated with 8.7 g. of morpholine (0.1 mole). The solution is stirred one hour at 25° C. and 23.5 g. of S-2-phenyl - 3-tert-butyl-5-hydroxymethyloxazolidine (0.1 mole) is added. Dry hydrogen chloride is passed into the solution at 25° C. until 4.0 g. (0.11 mole) is absorbed. After stirring 2 hours, 24 ml. of sulfur monochloride (0.3 mole) is added over a 10-minute period at 20–25° C. The mixture is stirred 4 hours at 25° C., poured into 600 ml. of water, the precipitated sulfur removed by filtration and the filtrate is heated at 60° C. for one-half hour. The mixture is extracted with two 50 ml. portions of ether and the aqueous layer then made strongly alkaline with excess sodium carbonate. The mixture is extracted again with two 100 ml. portions of ether and the ether extracts backwashed with two 25 ml. portions of water. The ether is removed by evaporation in vacuo and the oil residue obtained, S-3-morpholino-4-(3-tert-butylamino-2-hydroxypropoxy)-1,2,5-thiadiazole is dissolved in 50 ml. of tetrahydrofuran. This solution is treated with a solution of 11.6 g. of maleic acid and 40 ml. of tetrahydrofuran and the mixture aged 3 hours at 20° C. The precipitated maleate salt is filtered, washed with tetrahydrofuran and dried in vacuo at 50° C.

By replacing the morpholine used in the above procedure by an equivalent quantity of piperidine, 4-hydroxypiperidine, or N-methylpiperazine there is obtained respectively 3-piperidyl-4-(3-tert-butylamino-2-hydroxypropoxy)-1,2,5-thiadiazole,
3-(4-hydroxypiperidyl)-4-(3-tert-butylamino-2-hydroxypropoxy)-1,2,5-thiadiazole, and
3-N-methylpiperazinyl-4-(3-tert-butylamino-2-hydroxypropoxy)-1,2,5-thiadiazole.

It is, of course, obvious that any other oxazolidine of the structure

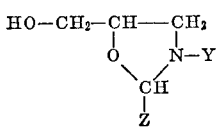

can be substituted for that employed in Example 11 to give the corresponding S-3-X'-4-[3-(Y-amino)-2-hydroxypropoxy]-1,2,5-thiadiazole.

The S-3-X-4-[3-(Y - amino)-2-hydroxypropoxy]-1,2,5-thiadiazole compounds prepared by the process of this invention as well as their salts have been found to exhibit β-adrenergic blocking properties and are thus useful in the management of angina pectoris. Because of this property the optically active products are useful for the control of tachycardia that may be drug induced (as by isoproterenol) or brought about by physiological conditions.

The optically active products particularly in the form of their salts can be prepared in pharmaceutical formulations suitable for oral or parenteral administration and also can be combined with other active ingredients for simultaneous administration. No special problems are involved in preparing suitable formulations of the optically active compounds or salts thereof and methods generally employed for this purpose, which are known to those skilled in this art, are entirely suitable. Dosage units of from about 2 mgs. to about 10 mgs. can be provided for the symptomatic adjustment of dosage of the optically atcive substances by the physician depending upon the age and condition of the patient.

Illustrative examples of suitable pharmaceutical compositions containing S(—)-3-morpholino-4-(3-tert-butylamino-2-hydroxypropoxy)-1,2,5-thiadiazole hydrogen maleate as active ingredient follow. Each of the compositions are prepared by conventional methods, and the quantities reecited are for each unit dosage. The other optically active products prepared as hereinbefore described can be similarly formulated.

INJECTABLE SOLUTION

|   | Mgs. |
|---|---|
| Active compound | 1 |
| Sodium chloride | 9 |
| Distilled water, q.s. 1.0 ml. |   |

CAPSULES

|   | Mgs. |
|---|---|
| Active compound | 5 |
| Magnesium stearate | 2.0 |
| Lactose, U.S.P. | 19.3 |

What is claimed is:
1. A process for the preparation of an optically active thiadiazole in the sinister configuration having the structure

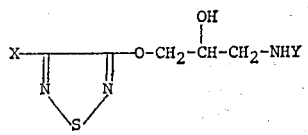

comprising the reaction of a 3-X-4-chloro-1,2,5-thiadiazole with 1,2-dihydroxy-3-(YHN-)propane in the sinister configuration in the presence of a strong base selected from an alkali metal alkoxide, an alkali metal hydroxide and sodium hydride, wherein the variable radical X is selected from chloro, lower alkyl, lower alkoxy, phenyl, benzyl, morpholino, piperidyl, hydroxy-piperidyl and N-lower alkyl-piperazinyl; Y is a straight or branched chain lower alkyl or hydroxy substituted straight or branched chain lower alkyl.

2. A process as claimed in claim 1 wherein the reaction is carried out in the presence of a strong base and at a temperature between 0° C. and the reflux temperature of the reaction mixture.

3. A process as claimed in claim 2 wherein the reactants are 3-morpholino-4-chloro-1,2,5-thiadiazole and S-1,2-dihydroxy-3-(Y-amino)propane to provide S-3-morpholino-4-[3-(Y-amino) - 2 - hydroxypropoxy]1,2,5-thiadiazole.

4. A process as claimed in claim 3 wherein the alkamine reactant is S(—)-1,2-dihydroxy-3-tert-butylaminopropane to provide S-(—)-3-morpholino-4-(3-tert-butylamino-2-hydroxypropoxy)-1,2,5-thiadiazole.

References Cited
UNITED STATES PATENTS 3,213,088 10/1965 Menzl _____ 260—239.95

ALEX MAZEL, Primary Examiner

J. TOVAR, Assistant Examiner

U.S. Cl. X.R.

260—268 H, 293.4 E, 302 D; 424—248

UNITED STATES PATENT OFFICE
CERTIFICATE OF CORRECTION

Patent No. 3,657,237                Dated April 18, 1972

Inventor(s) Leonard M. Weinstock, Roger J. Tull and Dennis M. Mulvey

It is certified that error appears in the above-identified patent and that said Letters Patent are hereby corrected as shown below:

In column 1, line 70, change that part of "Structure I" reading 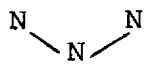 to read 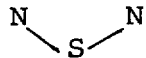
In column 3, line 36, change "optionally" to read --optimally--.
In column 5, line 11, change "R" to read --$R^3$--. In column 8, line 55, correct the spelling of "bis". In column 11, line 62, immediately following "epoxy-" add -- 1- --. In column 12, line 51, immediately following "epoxy-" add -- 1- --; in line 61, delete "and"; and in line 71, immediately preceding "Step A", add --EXAMPLE 9--. In column 13, line 63, immediately following "($\beta$,$\beta$" add --'--. In column 14, line 30, change "$\beta$" to read --3--; in line 70, immediately preceding "3-piperidyl" add -- S- --; in line 72, immediately preceding "3-(4-hydroxy" add -- S- --; and in line 74, immediately preceding "3-N-methyl" add -- S- --.

Signed and sealed this 8th day of August 1972.

(SEAL)
Attest:

EDWARD M. FLETCHER, JR.          ROBERT GOTTSCHALK
Attesting Officer                Commissioner of Patents